United States Patent [19]
Hillan et al.

[11] Patent Number: 5,834,961
[45] Date of Patent: Nov. 10, 1998

[54] GATED-CLOCK REGISTERS FOR LOW-POWER CIRCUITRY

[75] Inventors: John Hillan, San Diego; Christopher Cooke, Solana Beach, both of Calif.

[73] Assignee: Pacific Communication Sciences, Inc., Fremont, Calif.

[21] Appl. No.: 774,886

[22] Filed: Dec. 27, 1996

[51] Int. Cl.$^6$ ....................................................... H03K 1/04
[52] U.S. Cl. ........................... 327/295; 327/293; 327/544
[58] Field of Search .................................... 327/295, 293, 327/544, 144, 150

[56] References Cited

U.S. PATENT DOCUMENTS 5,428,765   6/1995   Moore ...................................... 327/292
5,675,282  10/1997   Saito ....................................... 327/544

*Primary Examiner*—Margaret Rose Wambach
*Attorney, Agent, or Firm*—Martin J. Jaquez; John Land; Steven A. Shaw

[57] ABSTRACT

A method and apparatus for analyzing each microinstruction in a microinstruction-based electronic circuit having a plurality of registers to determine which registers in a processing cycle are not involved in the processing cycle, and preventing those registers from being clocked during such processing cycle. Hence, inactive registers during a processing cycle do not consume power at the level of active registers, thus lowering overall power usage by any system employing such gated-clock registers.

2 Claims, 2 Drawing Sheets

GATED-CLOCK REGISTERS FOR LOW-POWER CIRCUITRY

BACKGROUND OF THE INVENTION

1. Field of the Invention

This invention relates to electronic circuitry, and more particularly to a method and apparatus for reducing power usage by registers in low-power circuits.

2. Description of Related Art

Low power electronic circuits are commonly used in battery-operated products such as cellular telephones, calculators, computers, etc. Much effort has been devoted by the electronics industry to provide greater functionality for such circuits while reducing power requirements.

Various types of low power circuits use a plurality of registers (also known as register files) to store multiple bits of data. For example, a microprocessor or microcontroller circuit often has multiple registers for storing data values and instructions. FIG. 1 is a block diagram of a typical prior art microprocessor showing a set or bank of 8 registers 1 are coupled to input selectors 2 and output selectors 3 as shown. Other elements, such as multiplexers 4, 5, barrel shifter 6, and arithmetic logic unit 7, are coupled in a loop to the inputs selectors 2 and output selectors 3 for the registers 1. Typically, one to three registers are involved in any one processing cycle. A microinstruction controlling a particular processing cycle specifies which registers are involved.

Registers are generally designed to be fast and static (i.e., do not require refreshing), and thus generally comprise a plurality of static storage elements, each element comprising a plurality of transistor elements. Static storage elements can consume a fairly large amount of power. It would be desirable to reduce power consumption by registers used in low power circuits.

The present invention provides a method and apparatus for accomplishing this goal.

SUMMARY OF THE INVENTION

The invention is based on the observations that (1) a characteristic of static storage elements is that they draw some power when clocked (i.e., when a synchronizing signal is applied to each element to transfer input to output, if the element is enabled), but draw substantially more power when the data within the elements is changing instead of static, and (2) not all registers are used in each processing cycle. Accordingly, the present invention analyzes each microinstruction to determine which registers in a processing cycle are not involved in the processing cycle, and prevents those registers from being clocked during such processing cycle. Hence, inactive registers during a processing cycle do not consume power at the level of active registers, thus lowering overall power usage by any system employing such gated-clock registers.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

A characteristic of static storage elements is that they draw some power when clocked (i.e., when a synchronizing signal is applied to each element to transfer input to output, if the element is enabled), but draw substantially more power when the data within the elements is changing instead of static. In conventional circuitry using registers (e.g., microprocessors or microcontrollers), all registers are clocked even when no change is to be made to the contents of each register. Further, not all registers are used in each processing cycle. Accordingly, the present invention analyzes each microinstruction to determine which registers in a processing cycle are not involved in the processing cycle, and prevents those registers from being clocked during such processing cycle. (As used herein, "microinstruction" means any collection of bits controlling processing cycles).

Figure 1:
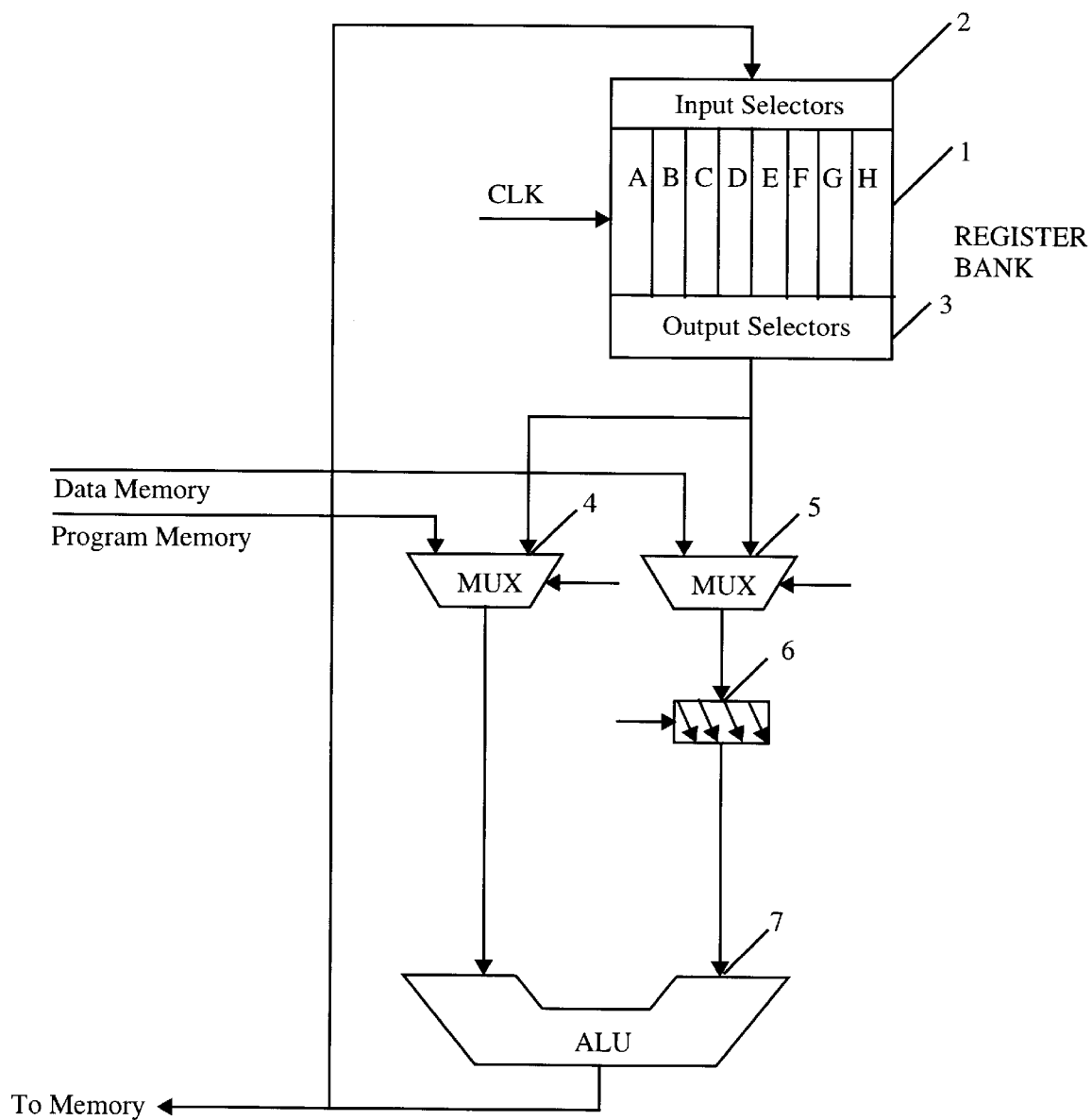
FIG. 1 is a block diagram of a typical prior art microprocessor showing a set of 8 registers coupled to input selectors and output selectors.
Figure 2:
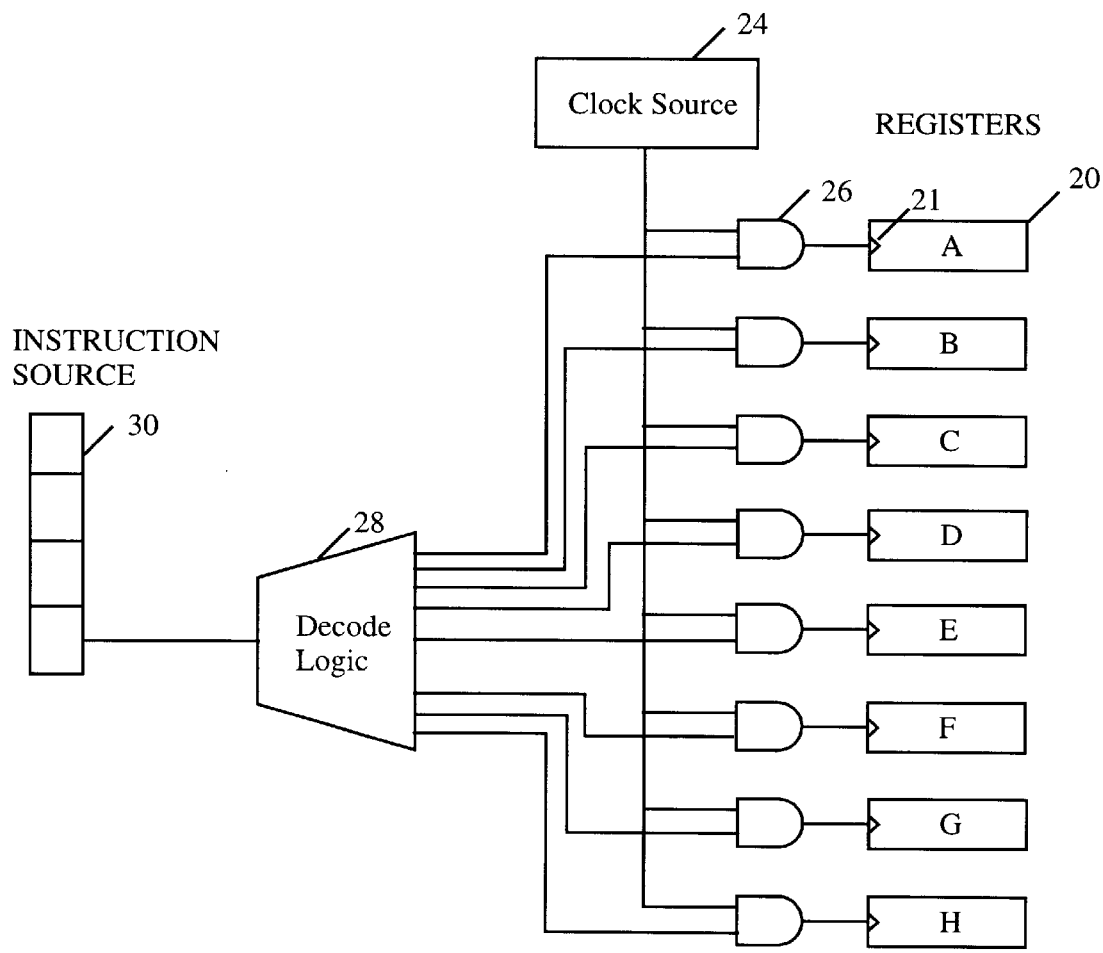
FIG. 2 is a block diagram showing the preferred embodiment of the invention.

FIG. 2 is a block diagram showing the preferred embodiment of the invention. A set of registers 20, similar to the register bank 1 shown in FIG. 1, have their clock inputs 21 coupled through corresponding AND gates 26 to a clock signal from a clock source 24. Also coupled to each AND gate 26 is decode logic 28, which in turn is coupled to an instruction source 30 (which may be, for example, a ROM). While FIG. 2 shows the functional aspects of the invention most clearly, in practice it may be preferred to directly couple the clock source 24 to the decode logic 28, and incorporate the AND gates 26 directly into the decode logic 28.

The decode logic 28 determines which of the registers 20 are involved in each processing cycle by examining the appropriate fields or bit positions of the microinstruction controlling that particular processing cycle. That is, each microinstruction has at least one indication of which of the plurality of registers are active during each processing cycle. If a register is not involved in a processing cycle, then the decode logic 28 blocks the clock signal from the clock source 24 from being applied to the clock input 21 of that register 20 through the corresponding AND gate 26. (In the preferred embodiment, the output control signal of the decode logic 28 is synchronized to the falling edge of the clock to avoid clock "glitches" or noise). Conversely, if a register is involved in a processing cycle, then the decode logic 28 allows the clock signal from the clock source 24 to pass to the clock input 21 of that register 20. Hence, unused (inactive) registers during a processing cycle do not consume power at the level of used (active) registers, thus lowering overall power usage by any system employing such gated-clock registers.

EXAMPLE

The following commented code sets forth one example of the invention. The code may be directly compiled to generate circuitry that embodies the functionality of the decode logic 28, using, for example, "Design Compiler" from Synopsys, Inc., Mountain View, Calif. However, one of skill in the art will recognize that the decode logic 28 may also be implemented in conventional combinatorial logic, as a programmable logic array, or in equivalent circuitry.

```
---- Entity which decodes the instruction word to determine which
---- register (if any) is to be updated based on the current
---- instruction
library   IEEE;
use       IEEE.std_logic_1164.all;
entity reg_update_control is
  port (
    -- Update specified register if logic 1:
    update_reg_a : out std_logic;
    update_reg_b : out std_logic;
    update_reg_c : out std_logic;
    update_reg_d : out std_logic;
    update_reg_e : out std_logic;
    update_reg_f : out std_logic;
    update_reg_g : out std_logic;
    update_reg_h : out std_logic;
    -- Current processor instruction:
    instruction : in std_logic_vector(23 downto 0);
    -- Result of instruction condition check:
    condition : in std_logic
  );
end reg_update_control;
architecture behave of reg_update_control is
    -- Declaration of register mapping in instruction fields
    constant REGISTER_A : std_logic_vector(2 downto 0) := "000";
    constant REGISTER_B : std_logic_vector(2 downto 0) := "001";
    constant REGISTER_C : std_logic_vector(2 downto 0) := "010";
    constant REGISTER_D : std_logic_vector(2 downto 0) := "011";
    constant REGISTER_E : std_logic_vector(2 downto 0) := "100";
    constant REGISTER_F : std_logic_vector(2 downto 0) := "101";
    constant REGISTER_G : std_logic_vector(2 downto 0) := "110";
    constant REGISTER_H : std_logic_vector(2 downto 0) := "111";
    -- Declaration of instruction format:
       -- Format 1 allows register updating
       -- Format 2 does not
    constant INSTR_FORMAT_1 : std_logic := '0';
    constant INSTR_FORMAT_2 : std_logic := '1';
    -- Explanatory constants to enhance readability:
    constant DONT_UPDATE    : std_logic := '0';
    constant CONDITION_MET  : std_logic := '1';
    -- Local signals:
    signal target_reg : std_logic_vector(2 downto 0);
    signal update_bit : std_logic;
    signal update_reg : std_logic;
begin
    -- The target register is read from the current instruction
    -- in format 1 commands and defaults to register A otherwise.
    target_reg <= instruction(2 downto 0)
        when (instruction(23) = INSTR_FORMAT_1)
    else REGISTER_A;
    -- The update bit is read from the current instruction
    -- in format 1 commands and defaults to "don't update" otherwise
    update_bit <= instruction(3)
        when (instruction(23) = INSTR_FORMAT_1)
    else DONT_UPDATE;
    -- A register will update if the bit in the instruction is set,
    -- and the condition for execution was met (this is evaluated
    -- elsewhere)
    update_reg <= update_bit
    when (condition = CONDITION_MET)
    else DONT_UPDATE;
    -- The individual update controls combine the overall update
    -- control and the target register obtained earlier;
    -- note that all control signals are combinational and
    -- must be stabilized elsewhere
    update_reg_a <= update_reg when (target_reg = REGISTER_A)
    else DONT_UPDATE
    update_reg_b <= update_reg when (target_reg = REGISTER_B)
    else DONT_UPDATE
    update_reg_c <= update_reg when (target_reg = REGISTER_C)
    else DONT_UPDATE
    update_reg_d <= update_reg when (target_reg = REGISTER_D)
    else DONT_UPDATE
    update_reg_e <= update_reg when (target_reg = REGISTER_E)
    else DONT_UPDATE
    update_reg_f <= update_reg when (target_reg = REGISTER_F)
    else DONT_UPDATE
    update_reg_g <= update_reg when (target_reg = REGISTER_G)
    else DONT_UPDATE
    update_reg_h <= update_reg when (target_reg = REGISTER_H)
    else DONT_UPDATE
end behave;
```

The following commented code sets forth one example of a register 20, including the AND gate 26, as well as the circuit that synchronizes the decode logic 28 to the falling edge of the clock.

```
---- Entity which implements a 16 bit data register with an update
---- control supplied by a module which decodes an instruction
library   IEEE;
use       IEEE.std_logic_1164.all;
entity data_register is
  port (
    -- register value:
    data_value : out std_logic_vector(15 downto 0);
    -- new value to load:
    next_value : in std_logic_vector(15 downto 0);
    -- control signal from reg_update_control:
    do_update : in std_logic;
    -- system clock:
    clock : in std_logic;
    -- active low asynchronous reset:
    reset_b : in std_logic
  );
end data_register;
architecture behave of data_register is
    -- Explanatory constants to enhance readability:
    constant RESET_VALUE    : std_logic_vector(15 downto 0)
        := (others => '0');
    constant CLOCK_FALLING  : std_logic := '0';
    constant CLOCK_RISING   : std_logic := '1';
    -- Local signals:
    signal stable_update        : std_logic;
    signal masked_clock         : std_logic;
    signal register_output      : std_logic_vector(15 downto 0);
begin
    -- The clock to the register which stabilizes the update signal
    -- operates on the system clock falling; this is because the
    -- instruction is fetched on the system clock rise, so the update
    -- controls are unstable during system clock high; the information
    -- needed to determine whether to fire the register is needed
    -- around the subsequent system clock high, and is
    -- thus optimally maintained by a falling edge register.
    -- During reset, register updates are disabled; it requires the
    -- assertion of the update control from the reg_update_control
    -- module to enable the clock to the main register bank.
    process (clock, reset_b)
    begin
        if reset_b = '0' then
            stable_update <= '0';
        elsif (clock'event and clock = CLOCK_FALLING) then
            stable_update <= do_update;
        end if;
    end process;
    -- The clock to the main register bank is enabled only when the
    -- stabilized control signal is active high; in this event, the
    -- system clock is passed to the data registers themselves. Since
    -- the stabilized control signal is a constant value from falling
    -- edge to falling edge of the system clock, there is no danger of
    -- introducing glitches.
    masked_clock <= stable_update and clock;
    -- The data is held in a bank of registers as in prior art, except
    -- that the clock is controlled in the manner described above.
    process(masked_clock, reset_b)
    begin
        if reset_b = '0' then
            register_output <= RESET_VALUE;
        elsif (masked_clock'event and masked_clock = CLOCK_RISING)
            then register_output <= next_value;
        end if;
    end process;
    -- The register value is the data output from the module:
    data_value <= register_output;
end behave;
```

Power savings using the invention depends on the implementing semiconductor technology, the style of the storage element circuitry comprising each register, and the width of each register. In one embodiment in which the invention was used for a 16-bit register, power savings from clocking only active registers was about 20% to 25%. For a smaller register width, the percentage saved would be lower, while for a wider register, the percentage saved is potentially considerably higher.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A circuit for controlling power usage in an electronic system (1) having a processing cycle synchronized by a clock signal from a clock source and (2) utilizing a plurality of registers clocked by the clock signal and under control of microinstructions, each microinstruction having at least one indication of which of the plurality of registers are active during each processing cycle, the circuit comprising:

(a) a plurality of control gates, each having an output coupled to a clock input of a corresponding registers and an input coupled to the clock signal from the clock source;

(b) decode logic, having an input coupled to a source of microinstructions and a plurality of output, each coupled to a corresponding control gate, for determining, from the at least one indication of which of the plurality of registers are active during each processing cycle, which of the plurality of registers will be inactive during each processing cycle, and for blocking the clock signal through the control gate of each such inactive register, thereby controlling power usage of the system.

2. A method for controlling power usage in an electronic system (1) having a processing cycle synchronized by a clock signal from a clock source and (2) utilizing a plurality of registers clocked by the clock signal and under control of microinstructions, each microinstruction having at least one indication of which of the plurality of registers are active during each processing cycle, the method comprising the steps of:

(a) determining, from the at least one indication of which of the plurality of registers are active during each processing cycle, which of the plurality of registers will be inactive during each processing cycle; and (b) blocking the clock signal to each such inactive register, thereby controlling power usage of the system.

* * * * *